H. H. GONTRUM AND H. G. COSTER.
TRUCK.
APPLICATION FILED OCT. 23, 1919.
1,368,716.
Patented Feb. 15, 1921.
2 SHEETS—SHEET 2.
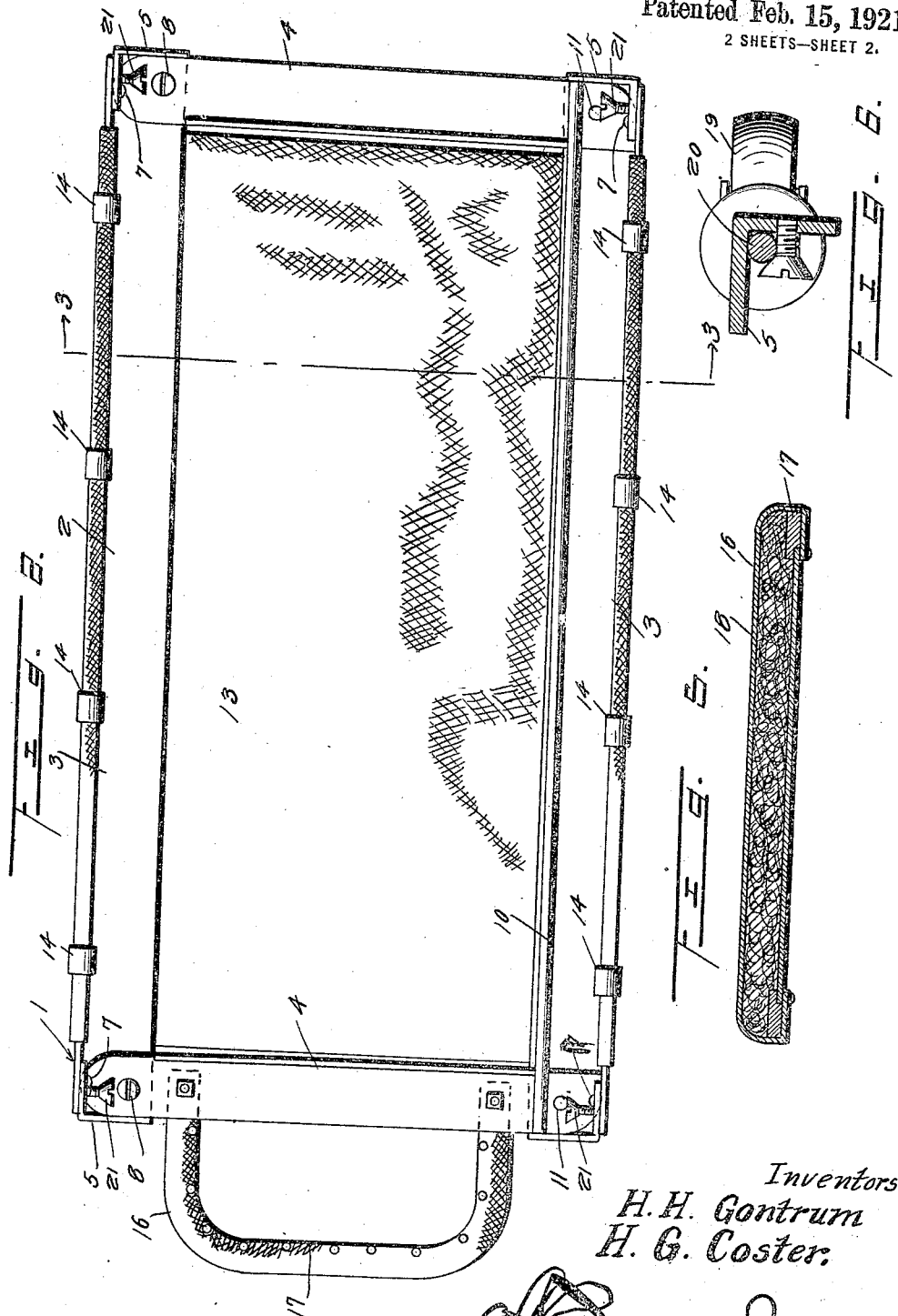
Inventors
H. H. Gontrum
H. G. Coster.
By
Attorney

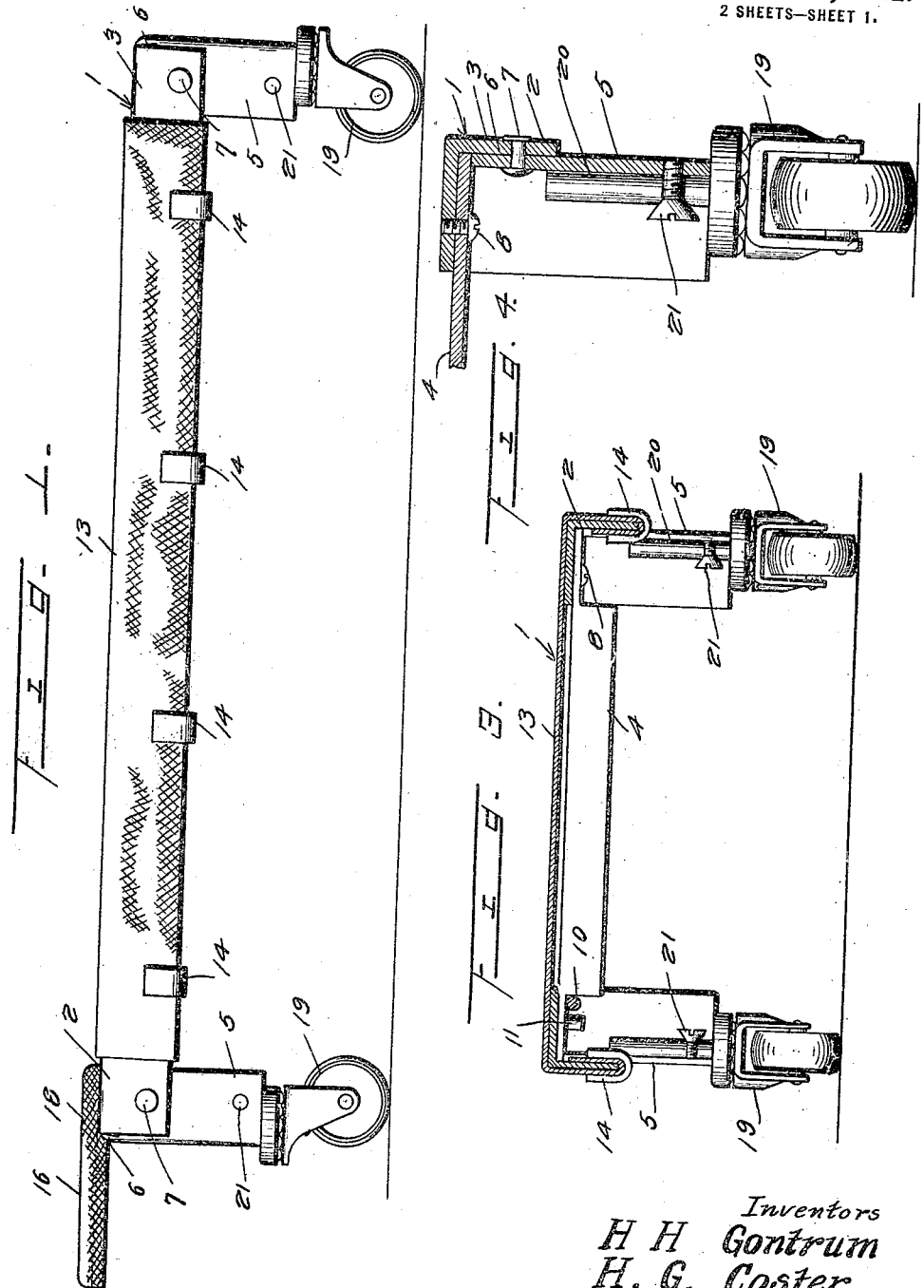

UNITED STATES PATENT OFFICE.

HENRY H. GONTRUM, OF BALTIMORE, AND HELGE G. COSTER, OF ELLICOTT CITY, MARYLAND.

TRUCK.

1,368,716.  Specification of Letters Patent.  Patented Feb. 15, 1921.

Application filed October 23, 1919. Serial No. 332,635.

*To all whom it may concern:*

Be it known that we, HENRY H. GONTRUM and HELGE G. COSTER, citizens of the United States, residing at Baltimore and Ellicott City, respectively, in the city and county of Baltimore and Howard, respectively, and State of Maryland, have invented certain new and useful Improvements in Trucks; and we do hereby declare the following to be a full, clear, and exact description of the invention, such as will enable others skilled in the art to which it appertains to make and use the same.

This invention relates to new and useful improvements in portable trucks and has for one of its objects the provision of a device of this character which can be conveniently folded into a compact article or device so that it can be stored in a comparatively small space or can be carried from one point to another with convenience and when unfolded will form a comfortable rest for a person to lie on.

Another object of this invention is the provision of means so that the device can be easily moved from one point to another while supporting a person, thus rendering the device very useful in repairing automobiles and other vehicles from underneath said automobiles or vehicles.

A further object of this invention is the provision of a truck of the above stated character, which shall be simple, durable and efficient, and which may be manufactured and sold at a comparatively low cost.

With these and other objects in view as will become more apparent as the description proceeds the invention consists in certain novel features of construction, combination and arrangement of parts as will be hereinafter more fully described and claimed.

For a complete understanding of our invention, reference is to be had to the following description and accompanying drawings, in which:—

Figure 1 is a side elevation of a truck constructed in accordance with our invention, Fig. 2 is a plan view of the same, Fig. 3 is a transverse sectional view taken on the line 3—3 of Fig. 2, Fig. 4 is a detail sectional view illustrating the means of securing the casters to the legs of the frame, and Fig. 5 is a detail sectional view illustrating the construction of the head rest.

Fig. 6 is a detail horizontal sectional view of one of the legs illustrating the means of securing the casters thereto.

Referring in detail to the drawings, the numeral 1 indicates as an entirety a portable truck consisting of a frame 2 that includes side and end members 3 and 4 and which members are constructed from angle iron. The side members 3 project beyond the end members 4 and are bent at right angles thereto to form supporting legs 5. The vertical portions of the side members 3 are severed or cut as shown at 6 and at a point of the formation of the legs thereon and the legs are secured to said portions by rivets 7 so as to strengthen and reinforce said legs.

The end members 4 are pivoted to one of the side members 3 as illustrated at 8 and have their other ends disposed under the horizontal portion of the other side member. A guide rod 10 is secured to the legs of the last named side member and underlies the free ends of the end members 4. Studs 11 are formed on the free ends of the side members 4 and are adapted to have slidable contact with the guide rod 10 when the device is folded or collapsed. To collapse the frame, the free ends of the end members 4 are moved in the direction of each other along the guide rod which causes the side members 3 to move in close relation to each other thus forming a very compact device.

A cover 13 consisting of a sheet of fabric is placed across the frame 1 and extends downwardly and over the lower edges of the vertical portions of the side members 3 and are secured thereon by substantially V-shaped clips or clamps 14 so that the cover is held on the frame in a taut condition making it very comfortable for a person resting thereon.

A head rest 16 consisting of a frame 17 is secured to one of the end members 4 and the frame has mounted thereon suitable padding 18 to form an efficient pillow or head rest to the device.

Casters 19 having shanks 20 are secured to the legs by means of set bolts 21 providing a construction wherein the casters can be removed whenever desired and when the device is equipped with the casters makes the same comparatively easy to move from one point to another while supporting a person. This being desirable when a person is lying upon the device and making repairs to the underneath part of an automobile or vehicle and in a good many instances the repairer or person on the truck desires to shift the truck from one point to another underneath the automobile to make the necessary repairs and all there is necessary for the person to do is to lie upon the device and move the device along over the floor with his feet and hands.

While we have shown and described the preferred embodiment of our invention, it will be understood that minor changes in construction, combination, and arrangement of parts may be made without departing from the spirit and scope of the invention as claimed.

Having thus described the invention, what is claimed is:—

1. A truck comprising a frame including side and end members, means pivoting one of the ends of the end members to one of the side members, a guide rod secured to one of the side members and slidably supporting the free ends of the end members, guide pins secured to the free ends of the end members and engaging the rod on an opposite side from the ends of the end members that are pivoted to one of the side members, and a cover secured to the frame.

2. A truck comprising a frame including side and end members constructed from angle iron, said side members projecting beyond the end members and being bent at right angles to form supporting legs, the vertical portions of said side members being cut at a point of formation of the legs thereto, means securing the legs to the cut portions of the side members, means pivoting one of the ends of the end members to one of the side members, a rod secured to the other side member and slidably supporting the free ends of the end members, guide pins secured to the end members and engaging the rods, and a cover secured to the frame.

In testimony whereof we affix our signatures in presence of two witnesses.

HENRY H. GONTRUM.
HELGE G. COSTER.

Witnesses:
 CARY D. HALL, Jr.,
 Mrs. ZEMI BAKER.